United States Patent
Weigelt

(10) Patent No.: US 8,191,282 B2
(45) Date of Patent: *Jun. 5, 2012

(54) DEVICE AND METHOD FOR OBTAINING ENERGY CARRIERS FROM MOIST BIOMASS

(75) Inventor: Horst Weigelt, Guetersloh (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 338 days.

This patent is subject to a terminal disclaimer.

(21) Appl. No.: 12/478,226

(22) Filed: Jun. 4, 2009

(65) Prior Publication Data
US 2009/0313847 A1    Dec. 24, 2009

(30) Foreign Application Priority Data
Jun. 19, 2008   (DE) .................. 10 2008 028 860

(51) Int. Cl.
*F26B 3/34*    (2006.01)

(52) U.S. Cl. .............................. 34/274; 34/527; 34/282
(58) Field of Classification Search ............... 34/274, 34/527, 282; 56/10.1; 422/187; 241/101.742
See application file for complete search history.

(56) References Cited

U.S. PATENT DOCUMENTS

| 3,559,566 A | * | 2/1971 | Aspegren et al. ............... 100/38 |
| 3,593,429 A | * | 7/1971 | Thompson ....................... 34/344 |
| 2006/0130396 A1 | * | 6/2006 | Werner ............................ 44/590 |

FOREIGN PATENT DOCUMENTS
DE   10 2004 003 011    8/2005
* cited by examiner

*Primary Examiner* — Mark Halpern
(74) *Attorney, Agent, or Firm* — Michael J. Striker

(57) ABSTRACT

A device for obtaining energy carriers from moist biomass includes a dehydration device for mechanically pre-dehydrating the biomass, and a drying step for post-dehydrating the pre-dehydrated biomass via the addition of heat. The dehydration device includes a first dehydration step and a second dehydration step, which is combined with the drying step to form a single assembly.

20 Claims, 2 Drawing Sheets

DEVICE AND METHOD FOR OBTAINING ENERGY CARRIERS FROM MOIST BIOMASS

CROSS-REFERENCE TO RELATED APPLICATION

The invention described and claimed hereinbelow is also described in German Patent Application DE 10 2008 028 860.8 filed on Jun. 19, 2008. This German Patent Application, whose subject matter is incorporated here by reference, provides the basis for a claim of priority of invention under 35 U.S.C. 119(a)-(d).

BACKGROUND OF THE INVENTION

The present invention relates to the utilization of moist biomass as an energy source, in particular of grain and, above all, corn.

Dry grain is used as an energy source in isolated cases, but doing so raises ethical concerns, because the grain could theoretically be used as a source of food for the human population. Grain that is harvested while moist, and that is traditionally used only as cattle feed, does not raise these ethical concerns. Corn, for instance, which is cultivated for use as livestock feed in many areas in Europe, often requires a longer vegetation time to mature than the climate allows. It must therefore be harvested in the moist state, when its quality makes it unsuitable for use as a food source for the human population.

One problem associated with the use of biomass—regardless of the type—as an energy source is its water content. A high water content reduces the storability of the biomass, results in high hauling costs, reduces the energy yield of combustion, and lowers the exhaust quality. Drying the biomass in open spaces requires a great deal of time and large spaces, and drying the biomass by heating it often consumes more energy than may be produced via the combustion of the dry biomass.

DE 10 2004 003 011 A1 makes known a generic device that includes a dehydration device for mechanically pre-dehydrating the biomass, and a drying step for post-dehydrating the pre-dehydrated biomass via the addition of heat. In this case as well, the use of primary energy that is required to make the biomass usable for further processing so that it may used directly or indirectly as an energy carrier is crucially dependent on the extent pre-dehydration that is attainable using the mechanical dehydration device, and on the efficiency of the drying step.

SUMMARY OF THE INVENTION

The object of the present invention, therefore, is to create a technique that makes it possible, using as little energy as possible, to dehydrate moist biomass in a brief period of time and in a compact system to the extent that it may be converted into an energy source in a cost-effective manner.

The object is attained by the fact that, in a device for obtaining an energy carrier from a moist biomass of the type described above, the dehydration device includes a first dehydration step, or station, and a second dehydration step (station) which is combined with the drying step to form one assembly. The dehydration device is divided into two parts in order to account for the fact that freshly harvested biomass usually has a water content of 80% or more, and that removing a substantial portion of this water results in a considerable decrease in the material throughput rate, but simultaneously results in a considerable change in the consistency of the material. Dividing the dehydration device into two parts accounts for this face in that the two dehydration steps are designed for markedly different material throughput rates in accordance with the loss of mass resulting from the dehydration that is carried out in a first step, and in that different techniques and/or processing parameters that are adjusted to accommodate the consistency of the material are used in the first and second dehydration steps. Given that the second dehydration step—which may be more compact in design than the first dehydration step, since the quantity of material it must process is smaller—is combined with the drying step to form a single assembly, a compact design is attained in which the amount of energy required to convey the material is minimized, since the paths are short.

The drying step or station preferably includes a mixing container that may be loaded simultaneously with the pre-dehydrated biomass and a thermal transfer material. Given that the biomass comes in direct contact with the thermal transfer material in the mixing container, a more efficient and rapid heat exchange may be attained than in any heat exchanger that conveys a thermal transfer material and a material to be heated in separate lines, in the conventional manner.

The device advantageously includes a separation step (or station) provided with means for separating and removing the thermal transfer material from the post-dehydrated biomass. The separation step allows the thermal transfer material to be reclaimed, so that it may then be reheated and returned to dried, pre-dehydrated biomass. The separation step is preferably integrated in the assembly of the second dehydration step or station and the drying step.

The drying step is preferably heated via a circulation of the thermal transfer material, which extends through a heat source, the drying step, and the separation step.

The thermal transfer material is preferably combustible. In this manner, it is ensured that any thermal transfer material remaining in the post-dehydrated biomass does not negatively affects its use as a source of energy. On the contrary, it may improve the handling properties of the post-dehydrated biomass in that it allows it to be formed into thick clumps.

To make the dehydration of the biomass in the second dehydration step effective, a fragmentation step is preferably provided between the first dehydration step and the second dehydration step, in order to fragmentize the biomass after is passes through the first dehydration step. Given that the water that is weakly bound in the cellular structure of the biomass is removed in the first dehydration step, and the biomass is then fragmentized, a material is obtained that has a cellular structure that has been weakened due to the removal of water which took place in the initial dehydration step. Water that is released from the cells of the biomass in the second dehydration step may enter the open spaces—which were created in this manner—in the cellular structure relatively easily up to an interface with the particular piece of biomass, and then exit it.

The first dehydration step preferably utilizes at least one pair of compression rollers which forms compression gap through which the biomass passes.

The second dehydration step preferably utilizes a decanter or a screw extruder, both of which are suited for use to rapidly process large quantities of fragmentized material.

A heating device may be provided in order to heat the biomass that passes through the second dehydration step. The heating opens up the cellular structure of the material further, thereby further facilitating the dehydration process. Since this heating step is only used to further open up the cells of the biomass, but not to evaporate the moisture that remains, the output required of the heating device is minimal compared to the heat output that would be required to dry the biomass via evaporation.

In particular, given that the drying step takes place in close vicinity to the second dehydration step, it may be used simultaneously as the heating device described above, it being possible to heat the crop material practically cost-free as it passes through the second dehydration step since the drying step is thermally insulated in a manner such that the adjacent second dehydration step forms an essential discharge path via which the heat from the drying step is released into the surroundings.

The device may also include a reactor for the thermochemical treatment of the biomass that was dried in the drying step. Exothermal processes that take place at high temperatures in a reactor such as this, e.g. the carbonization of the biomass, make it possible to also heat the drying step essentially using dissipated heat, namely the heat dissipated from the reactor in this case.

Heat is supplied to the drying step by supplying hot reaction product from the reactor, as the thermal transfer material. Since the reaction products generally leave the reactor at a high temperature, it is generally desirable to cool down a reaction product before it is sent for storage in a tank, and, given that the reaction product is used as the thermal transfer material in the drying step, the residual heat that it dissipates anyway may be put to practical use.

It may be advantageous to supply hydrogen gas to the reactor in order to reduce the content of oxygen remaining in the reaction products contained therein, or to adjust the ratio of oxygen to carbon in these reaction products, and, therefore, to adjust the length of their carbon chains to a desired value.

An electrolysis step, in which the liquid that is removed in the dehydration device is electrolyzed, may be used to obtain the hydrogen.

A condensation step is preferably provided in order to capture the reaction products that were released in the reactor as vapor. The condensation step is also used to capture water that was carried in with the biomass or that was produced in the reactor, and that negatively impacts the quality of the condensate. In order to release a water-rich condensate obtained in the condensation step from hydrocarbon portions, the condensate may be sent through a filter, to which coke—which was also obtained from the reactor—may be added, as the filter material. In this manner, purified water may be deposited directly onto the field, as excess water from the mechanical dehydration steps. The coke, which is saturated in the filter with organic components, may be sent to the reactor, directly or indirectly.

Gaseous reaction products, in particular those that remain after the passage through the condensation step since they are non-condensable, are preferably used in the harvesting vehicle itself, in particular in a burner, as energy carriers in order to heat the reactor.

A concentration step which captures the aqueous portion that was removed in at least one of the dehydration steps may also be provided, in order to separate the aqueous portion into a portion that is enriched with dissolved substances, and into a portion from which dissolved substances were removed. While the enriched portion is generally collected in a tank of the harvesting vehicle for further processing, the portion from which dissolved substances were removed is preferably left on the field, as described above.

In particular, given that the drying step takes place in close vicinity to the second dehydration step, it may be used simultaneously as the heating device described above, it being possible to heat the crop material practically cost-free as it passes through the second dehydration step since the drying step is thermally insulated in a manner such that the adjacent second dehydration step forms an essential discharge path via which the heat from the drying step is released into the surroundings.

Further features and advantages of the present invention result from the description of exemplary embodiments below, with reference to the attached figures.

DESCRIPTION OF THE PREFERRED EMBODIMENTS

Figure 1:
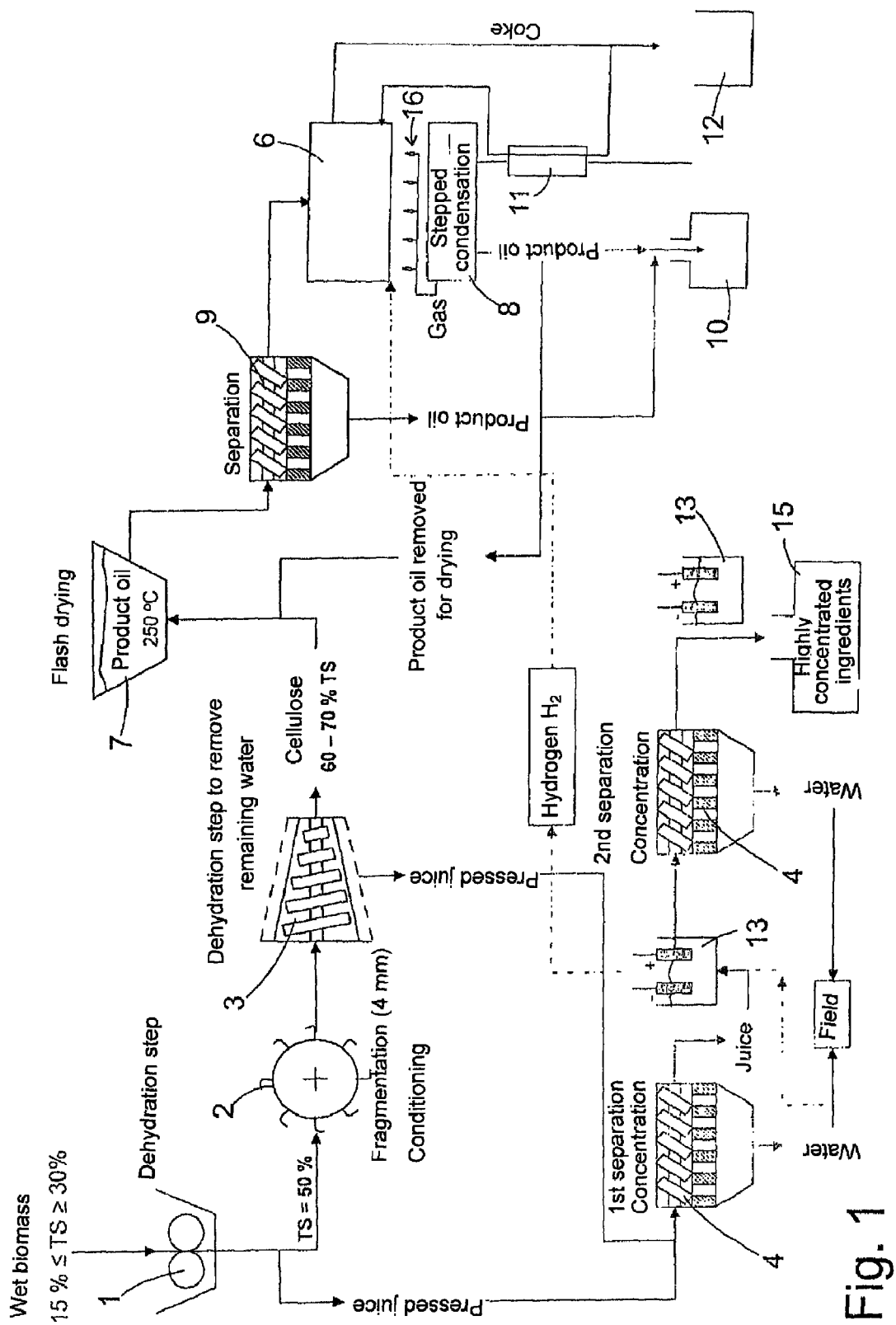
FIG. 1 shows a schematic depiction of processing units of a device according to the present invention.

The devices shown in FIG. 1 and which are described in detail below are installed in a harvesting vehicle in accordance with a preferred embodiment of the present invention. An external view of the harvesting vehicle is not shown, since its external design—provided it is not that of a conventional combine harvester or a forage harvester—is dictated only by the requirement that the devices shown in FIG. 1 be accommodated therein. Akin to a conventional forage harvester or combine harvester, the harvesting vehicle includes a ground drive, on the front of which a crop material pick-up device is mounted in a replaceable manner. The crop material pick-up device is identical to that of a conventional forage harvester or combine harvester, and it may be used in a replaceable manner thereon and on the harvesting vehicle according to the present invention.

Two compression rollers 1 form a gap toward which the harvested biomass is conveyed by the pick-up device. Depending on the type of plant material involved, when the biomass passes through compression rollers 1, it loses approximately half of its water; while the portion of the dry mass in the freshly picked-up biomass is between 10% and 30%, the portion of dry mass that remains after the biomass passes through compression rollers 1 has increased to 18% to 46%.

The biomass which was pre-dehydrated using compression rollers 1 then passes through a chopping step or station, that is a fragmentation station 2 which, as in the case of a forage harvester, may include a rotating cutting roller and stationary knives which interact therewith. The fragmentation is more intensive than it is in the case of a forage harvester, e.g. due to the knives being placed more closely together, or due to the biomass remaining in chopping step 2 for a longer period of time, with the result that, when the material leaves the chopping step, particles having a typical maximum size of 4 mm are obtained.

The fragmentized material obtained in the chopping step 2 is sent to a second dehydration step 3, e.g. a decanter or a sieve centrifuge. In conjunction with the intensive fragmentation, this makes it possible to increase the portion of dry mass to 88% to 98%. A fibrous, cellulose-rich solid material obtained in this manner, the mass of which now comprises only approximately 10% to 30% of the biomass that was originally picked up.

The dehydrated material that was output in the second dehydration step 3 passes through a drying step 7 and a separating step 9 before it is supplied to a flash pyrolysis reactor 6. This material is heated in reactor 6 in the absence of air, thereby converting it in a continual process into water, various hydrocarbons, and a residual portion of solid material that is composed essentially of carbon, and is referred to as coke. The reaction products that are released as gas at the high temperature of reactor 6 are sent to a condensation step 8 and are condensed into fractions having a different boiling point. In condensation step 8, non-condensable gas supplies burner 16 which heats reactor 6.

Fractionated condensation takes place in condensation step 8; parameters of the fractionation are defined such that a fraction essentially contains all of the water that entered reactor 6 with the biomass and that was created via the pyrolysis reactions that took place therein, while at least one further fraction which is referred to as product oil is composed essentially only of hydrocarbons. The product oil that is obtained is collected in a means for capturing the fluid, preferably in the form of a tank 10, except for a portion, preferably a fraction that condenses at a high temperature, which is redirected in entirety or partially to condensation step 8 so that it may be added in drying step 7 to the dehydrated biomass obtained in second dehydration step 3.

Drying step 7 may include kneading or stirring tools to mix the product oil with the dehydrated biomass. The high temperature of the product oil causes the moisture remaining in the biomass to evaporate, thereby making it possible to remove a mixture of product oil and essentially anhydrous biomass at the outlet of drying step 7.

Before this mixture reaches reactor 6, it passes through a separation step 9 in which the product oil is removed from the biomass under pressure. The product oil which is removed in this manner is collected in tank 10 along with the portion of product oil that was obtained in condensation step 8 and that was not sent to drying step 8.

According to a preferred development, a filter 11 is provided in order to clean the condensate fraction that was obtained in condensation step 8 and that is composed essentially of water. As the filter substrate, filter 11 uses a portion of the coke from reactor 6 which is conveyed continually through filter 11 in the counter-flow to the aqueous fraction, thereby saturating the aqueous fraction with the organic components. The water that is obtained via filtration may be deposited onto the field if necessary, after undergoing a post-cleaning step; the coke that is saturated with the organic portions may be collected together with the remaining coke from reactor 6 in a bunker 12, as the combustible material, or, depending on the extent of its saturation with water or organic material, it may be returned directly to reactor 6, as shown in FIG. 1, or it may be returned by the long route via drying step 7, to remove the organic components via distillation in reactor 6 and add them to the product oil.

Figure 2:
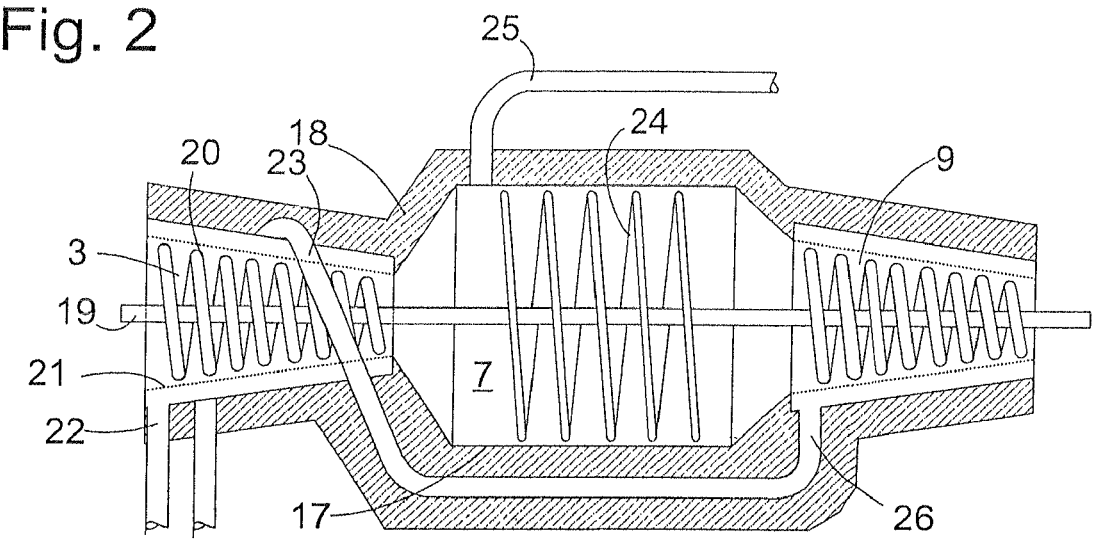
FIG. 2 shows a detailed view from FIG. 1.

Second dehydration step 3, drying step 7, and separating step 9 are combined into a single assembly which is depicted schematically in FIG. 2. All three of the steps are accommodated in the same thermally insulating sleeve 18 such that they are directly adjacent to one another. As shown, rotating augers or impeller blades of the three stages may be driven in a uniform manner via a common shaft 19, or a separate motor may be assigned to each stage, and stages 3, 7, 9 each include independent shaft pieces which are driven at a speed that may be adjusted according to the quantity and consistency of the material in every individual stage.

Dehydration step 3 or station includes a means for producing a pressed liquid in the form of a chamber having the shape of a truncated cone, in which an auger 20 rotates and presses or accelerates the biomass against a wall 21 of the chamber. Wall 21 contains openings, in the manner of a sieve, over a large portion of its surface, thereby enabling liquid that was pressed out of the biomass to pass through wall 21, travel through a discharge pipe 22 and reach concentration step 4. A heat exchanger pipe 23 which is depicted schematically in the figure as a single pipe loop that extends around dehydration step 3, but which may actually have a large number of loops, is distributed over other parts of wall 21. Auger 20 conveys the biomass through dehydration step 3 to an outlet located in a small base surface of the truncated cone-shaped chamber, to which drying step 7 is directly connected.

The drying step 7 (the post-drying step or station) includes means for post-dehydrating in the form of a cylindrical or barrel-shaped container 17 in which an auger or impeller-blade system 24 conveys the material and kneads it with hot product oil from reactor 6 that is supplied via a pipeline 25 located on the upstream end of container 17.

The product oil which is typically supplied at a temperature of 200 to 250° C. causes most of the water remaining in the biomass to evaporate quickly. A largely anhydrous flow of material is therefore obtained at the outlet of drying step 7, which has a consistency ranging from soupy to clumpy, depending on the ratio of biomass to product oil.

This material passes through separation step 9, the design of which may correspond largely to that of second dehydration step 3. Instead of water, the product oil is extracted in separation step 9, and the product oil that is reclaimed in this manner flows through discharge pipe 26 and heat exchanger 23, into tank 10 which is not depicted in FIG. 2.

Drying step 7 and the system of steps 3, 7, 9 shown in FIG. 2 may also be used in a harvesting vehicle having a simplified design in which reactor 6 is not included. In this case, in place of reactor 6, the vehicle includes an oil supply tank and whatever means are necessary to heat the oil obtained from this tank in order to supply drying step 7 with hot oil. Oil that is reclaimed in drying step 9 is returned to the tank or it is reheated immediately so that it may be added to the biomass that is obtained in dehydration step 3.

Oil losses that result from incomplete separation in separating step 9 are not excessively disturbing since the oil that is not separated out in separating step 9 increases the heat value of the dry biomass that is output in separation step 9 and gives it a highly compacted, clumpy consistency that is easy to handle.

In the simplest case, the water that is removed in dehydration steps 1 and 3 could be deposited directly onto the field. It is expedient, however, to remove the components in a concentration step 4 that are economically useful, such as sugars, proteins, starches, lipids, acids, or mineral elements, e.g. using a membrane filter or several filters of this type which are connected in series. Using known filtration technologies, it is possible in this manner to generate a flow which is enriched with valuable components and has a dry-mass portion of up to 80 per cent, the remainder being water from which the valuable components have been largely removed, the water being deposited onto the field.

In a post-drying step, the portion of solid material in the enriched flow may be increased to up to 90 per cent. The concentrate which is obtained in this manner is collected in a tank 15 on-board the harvesting vehicle for further use, e.g. as feed, as a raw material for the chemical industry, or as a raw material for fermentation processes to create biogas or ethanol.

According to another development of the present invention, an electrolysis cell 13 is provided, which is supplied with the enriched portion obtained in concentration step 4. Electrolysis cell 13 is supplied with frequency-modulated direct current in order to obtain a high yield of hydrogen using a reduced amount of energy. The hydrogen obtained via electrolysis is supplied to pyrolysis reactor 6. The increase in the hydrogen supply in reactor 6 attained in this manner improves the conversion of the oxygen bound in the biomass to water, thereby yielding an oil from the flash pyrolysis that contains less oxygen and is therefore of higher quality.

It will be understood that each of the elements described above, or two or more together, may also find a useful application in other types of constructions and methods differing from the types described above.

While the invention has been illustrated and described as embodied in a device and method for obtaining energy carriers from moist biomass, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A device for obtaining energy carriers from a moist biomass, comprising:
    a dehydration device including a first dehydration station and a second dehydration station, and a drying station, wherein said first dehydration station and said second dehydration station include means for mechanically pre-dehydrating the biomass, and wherein said drying station includes means for post-dehydrating the pre-dehydrated biomass via an addition of heat, wherein said second dehydration station is combined with said drying station to form a single assembly, and wherein said first dehydration station, said second dehydration station, and said drying station form a single, unitary module,
    wherein said first dehydration station includes means for producing a pressed liquid from said biomass before said biomass enters said drying station, and wherein said second dehydration station includes means for separating off a product oil from said biomass after said drying station.

2. The device as defined in claim 1, wherein said drying station includes a mixing container which is loadable simultaneously with the pre-dehydrated biomass and a thermal transfer material.

3. The device as defined in claim 2, further comprising a separation station for removing the thermal transfer material from the post-dehydrated biomass.

4. The device as defined in claim 3, wherein said separation station is a part of the assembly.

5. The device as defined in claim 3, further comprising a heat source arranged so that the thermal transfer material is circulated through said heat source, said drying station, and said separation station.

6. The device as defined in claim 2, wherein said thermal transfer material is a combustible thermal transfer material.

7. The device as defined in claim 1, further comprising a fragmentation station for fragmentizing the biomass after it passes through said first dehydration station, said fragmentation station being provided between said first dehydration station and said second dehydration station.

8. The device as defined in claim 1, wherein said first dehydration station includes at least one pair of compression rollers which form a compression gap through which the biomass passes.

9. The device as defined in claim 1, wherein said second dehydration station includes an element selecting from a group consisting of a decanter and a screw extruder.

10. The device as defined in claim 1, further comprising a heating device for heating the biomass that passes through said second dehydration station.

11. The device as defined in claim 1, further comprising a reactor for the thermochemical treatment of the biomass that was dried in the drying station.

12. The device as defined in claim 11, wherein said drying station is heatable using a heat dissipated from the reactor.

13. The device as defined in claim 12, wherein said reactor is configured so that the dissipated heat in a form of a reaction product is supplied from said reactor as a thermal transfer material.

14. The device as defined in claim 11, further comprising means for supplying hydrogen gas into said reactor.

15. The device as defined in claim 14, further comprising an electrolysis cell for obtaining hydrogen from water that was extracted from the biomass.

16. The device as defined in claim 11, further comprising a condensation station for condensing vaporous products of said reactor and removing an aqueous condensate, and a filter through which the aqueous condensate flows, and to which coke from said reactor is addable as a filter material.

17. The device as defined in claim 11, further comprising a burner for heating said reactor, said burner being supplied with gaseous reaction product from said reactor.

18. The device as defined in claim 1, further comprising a concentration station including means for capturing a fluid that was removed in at least one of said dehydration stations, for separating the fluid into a portion that is enriched with dissolved substances, and into a portion from which dissolved substances have been removed.

19. The device as defined in claim 1, wherein the device is configured as a self-propelled harvesting machine.

20. The device as defined in claim 1, further comprising a collection tank for fluid that was removed in said dehydration device.

* * * * *